United States Patent
Mogilevsky et al.

(10) Patent No.: US 7,613,709 B2
(45) Date of Patent: Nov. 3, 2009

(54) SYSTEM AND METHOD FOR EDITING OPERATIONS OF A TEXT OBJECT MODEL

(75) Inventors: Alex Mogilevsky, Bellevue, WA (US); Evgeny N. Veselov, Sammamish, WA (US); Benjamin M. Westbrook, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 10/971,471

(22) Filed: Oct. 21, 2004

(65) Prior Publication Data

US 2006/0101030 A1     May 11, 2006

(51) Int. Cl.
*G06F 7/00* (2006.01)
*G06F 17/00* (2006.01)

(52) U.S. Cl. ................................ 707/100; 715/221
(58) Field of Classification Search ............ 707/101; 715/513
See application file for complete search history.

(56) References Cited

U.S. PATENT DOCUMENTS

| | | | | |
|---|---|---|---|---|
| 5,276,793 A | * | 1/1994 | Borgendale et al. ......... | 715/255 |
| 5,293,473 A | * | 3/1994 | Hesse et al. ................. | 715/272 |
| 5,920,870 A | * | 7/1999 | Briscoe et al. .......... | 707/103 R |
| 6,138,129 A | * | 10/2000 | Combs ......................... | 707/6 |
| 6,507,856 B1 | * | 1/2003 | Chen et al. .................. | 715/513 |
| 6,718,516 B1 | * | 4/2004 | Claussen et al. ............. | 715/513 |
| 6,745,208 B2 | * | 6/2004 | Berg et al. ................... | 707/201 |
| 6,978,422 B1 | * | 12/2005 | Bushe et al. ................. | 715/734 |
| 7,152,205 B2 | * | 12/2006 | Day et al. .................... | 715/523 |
| 7,185,277 B1 | * | 2/2007 | Bernstein et al. ............. | 715/513 |
| 2004/0205587 A1 | * | 10/2004 | Draper ........................ | 715/513 |
| 2005/0216922 A1 | * | 9/2005 | Mogilevsky et al. ........ | 719/328 |

\* cited by examiner

*Primary Examiner*—Hosain T Alam
*Assistant Examiner*—Azam Cheema
(74) *Attorney, Agent, or Firm*—Workman Nydegger

(57) ABSTRACT

An improved system and method for editing operations of a text object model is provided. To this end, a text object model and a text editing object model are employed. The text object model may have a data abstraction represented by a sequence of symbols and may provide a formatted text programming interface. The text editing object model may include a text editor for performing editing operations on the data abstraction using the formatted text programming interface. The editing operations may include splitting an element of the data abstraction into two elements, merging two elements of the data abstraction into one element, and copying a text range of the data abstraction, including a subelement within the text range.

36 Claims, 15 Drawing Sheets

SYSTEM AND METHOD FOR EDITING OPERATIONS OF A TEXT OBJECT MODEL

FIELD OF THE INVENTION

The invention relates generally to computer systems, and more particularly to an improved system and method for editing operations of a text object model.

BACKGROUND OF THE INVENTION

A conventional application for text processing typically requires specific knowledge of the implementation of text objects and their containers for performing editing functions to manipulate text objects and for performing layout functions for displaying the text objects. Usually the application includes code such as a text editor or a layout editor for arranging text objects for visual display. To function properly, the layout editor may require specific knowledge of the container to properly present the text objects within the container. Likewise, a text editor may require specific knowledge of the text objects to properly edit them. These editors typically perform a mapping function between content and layout.

It is easier to map between content and layout when each element of content is represented by one piece of layout. This may normally happen with forms where, for instance, one control may be represented by one button. However, this may not be the case for flowing content where one element of content may appear in many places in layout. For example, the content may flow around some complex shape or image. The relationship between structure of data and structure of layout may quickly become very complicated. Conventional editing operations thus rely on specific knowledge of the implementation of the text objects and container to efficiently translate between user view and the data representation of the content. Often these editing operations manipulate a whole element of content and move it within a given data structure such as deleting the element from or inserting the element in the data structure.

But where the details of the implementation data structure become hidden to the text processing application such that the text processing application does not have specific knowledge of the implementation of the text objects or their containers, then new editing techniques may be required for manipulating a representation of text objects and their containers. What is needed is a way for a text processing application to edit a data abstraction containing flowing content. Such a system and method should not require specific knowledge of the implementation data structure of text objects or their containers in order to perform editing operations. Moreover, editing operations for flowing content should be allowed to manipulate subelements of the content stream.

SUMMARY OF THE INVENTION

Briefly, the present invention provides an improved system and method for editing operations of a text object model. To this end, a text object model and a text editing object model are provided. The text object model may have a data abstraction represented by a sequence of symbols and may provide a formatted text programming interface. A text range within a data abstraction may be defined by two text positions. Each text position may be defined to be a reference to a location in the data abstraction. For identifying an element in the data abstraction, an element identification position may be defined to be a text position that references a location relative to an element in the data abstraction. Furthermore, position normalization may be performed, for example, to disambiguate which text position in the data abstraction may correspond to a user view perception of an insertion point.

The text editing object model may include a text editor for performing editing operations on the data abstraction using the formatted text programming interface. The editing operations may include splitting an element of the data abstraction into two elements, merging two elements of the data abstraction into one element, and copying a text range of the data abstraction, including a subelement within the text range. To split an element of the data abstraction, two new elements may first be inserted into the data abstraction, associated properties of the original element may be transferred to the two new elements, and the opening and closing tags of the original element may be extracted from the data abstraction. To merge two original elements of the data abstraction, a new element may first be inserted into the data abstraction, associated properties of the original elements may be transferred to the new element, and the opening and closing tags of the two original elements may be extracted from the data abstraction. To copy a text range of a data abstraction, opening and closing tags of ancestor elements may first be copied, opening and closing tags of elements enclosing a subelement may next be copied, range boundary markers may be then inserted into the copy of the text range, content within the opening and closing tags of the elements enclosing any subelements may be copied, and finally elements within the text range may be copied.

Other advantages will become apparent from the following detailed description when taken in conjunction with the drawings, in which:

DETAILED DESCRIPTION

Exemplary Operating Environment

Figure 1:
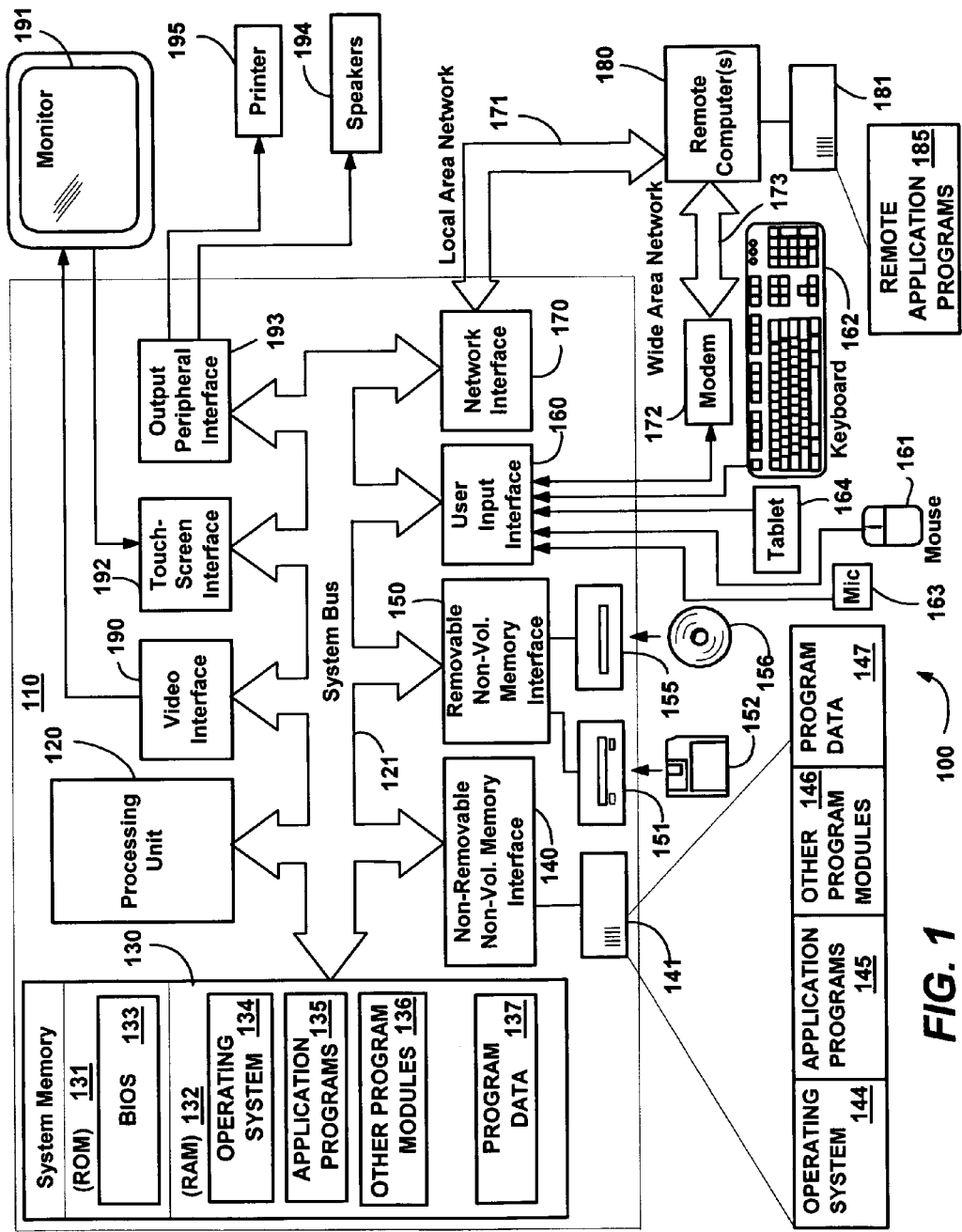
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 192 or the like. Note that the monitor and/or touch screen panel 192 can be physically coupled to a housing in which the computing device 110 is incorporated, such as in a tablet-type personal computer. In addition, computers such as the computing device 110 may also include other peripheral output devices such as speakers 124 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Editing Operations for a Text Object Model

The present invention is generally directed towards a system and method for editing operations of a text object model. A text editing object model will be described for performing editing operations on a data abstraction using the formatted text programming interface of the text object model. The editing operations that will be described may manipulate both elements and subelements of the data abstraction. Any type of content may be represented by the data abstraction such as text, auditory, visual or other type of content. As will be seen, the architecture of the present invention may be used by any text processing applications. As will be understood, the various block diagrams, flow charts and scenarios described herein are only examples, and there are many other scenarios to which the present invention will apply.

Figure 2:
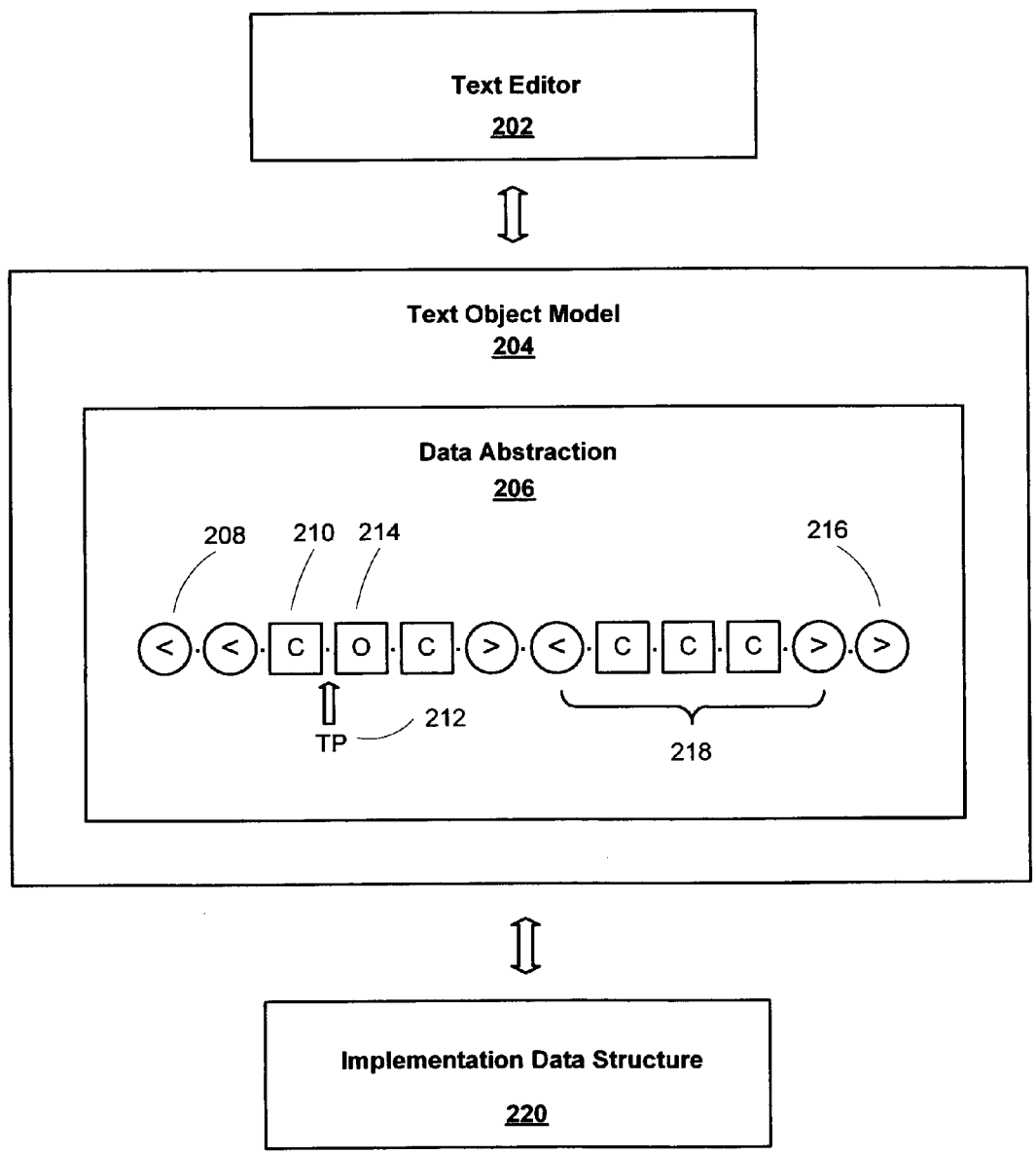
FIG. 2 is a block diagram generally representing an exemplary architecture of a text editing system, in accordance with an aspect of the present invention.

Turning to FIG. 2 of the drawings, there is shown a block diagram generally representing an architecture of a text editing system. The text editor 202 may be any executable software code including a kernel component, an application component, a linked library, an object, and so forth. The text editor 202 may be operably coupled to the text object model 204 for performing editing operations on the data abstraction of the text object model. In general, these editing operations may specify how to properly perform fundamental text manipulation operations on the text data represented by the data abstraction. For example, these operations may include splitting, merging, copying, or other fundamental text manipulations on some formatted text represented by the data abstraction. In one embodiment, the text editor may perform such editing operations using the formatted text programming interface of the text object model 204. To do so, these editing operations may use lower level editing methods provided by the text object model which may be found in copending U.S. patent application Ser. No. 10/717,024, titled "METHOD AND SYSTEM FOR ACCESS AND MODIFICATION OF FORMATTED TEXT" filed on Nov. 18, 2003, assigned to the assignee of the present application, and incorporated herein by reference for all that it discloses and teaches.

Central to the text editing system is a text object model 204 that may include a formatted text programming interface to provide a layer of abstraction for text processing and editing operations. This text object model 204 may define a data abstraction 206 as a sequence of symbols for representing formatted text. A data abstraction as used herein may mean a sequence of symbols and locations between the symbols. In one embodiment, each symbol may be defined to be one of the following four symbol types: one unit of content represented by a 16 bit Unicode code point, such as a character; an opening tag; a closing tag; or an embedded object. A location may be defined to be a single space between two adjacent symbols. A text position may be defined to be a pointer or reference to a location. For example, data abstraction 206 illustrates an opening tag 208, a unit of content 210, a text position 212, an embedded object 214, and a closing tag 216. Note that a unit of content and an embedded object may both be presented surrounded by a square in the data abstraction illustration, while an opening and closing tag may be presented surrounded by a circle in the data abstraction illustration. Each opening tag and closing tag may have one or more properties associated with it. These properties may include formatting properties such as bolding or highlighting text and these properties may include structural properties such as forming a paragraph or chapter of text. A sequence of symbols beginning with an opening tag and ending with an associated closing tag may define an element within the data abstraction. For example, data abstraction 206 illustrates an element 218 which is a sequence of symbols beginning with an opening tag and ending with a closing tag that may, for instance, represent italicized text, a paragraph, or other text structure or formatting.

The data abstraction 206 of the text object model 204 may advantageously be implemented by any data structure as illustrated by implementation data structure 220. In one embodiment, the implementation data structure 220 may be a text tree of pointers and nodes that may be organized to be efficient for tree traversal. Editing operations performed on the data abstraction of the text object model may in turn be implemented on the implementation data structure that may subsequently be displayed as a user view using a text view model, persistently stored, or otherwise output. Those skilled in the art will appreciate that the data abstraction provided by the text object model is intended to allow for any implementation data structure such as a link list, queue, or other data structure.

Figure 3:
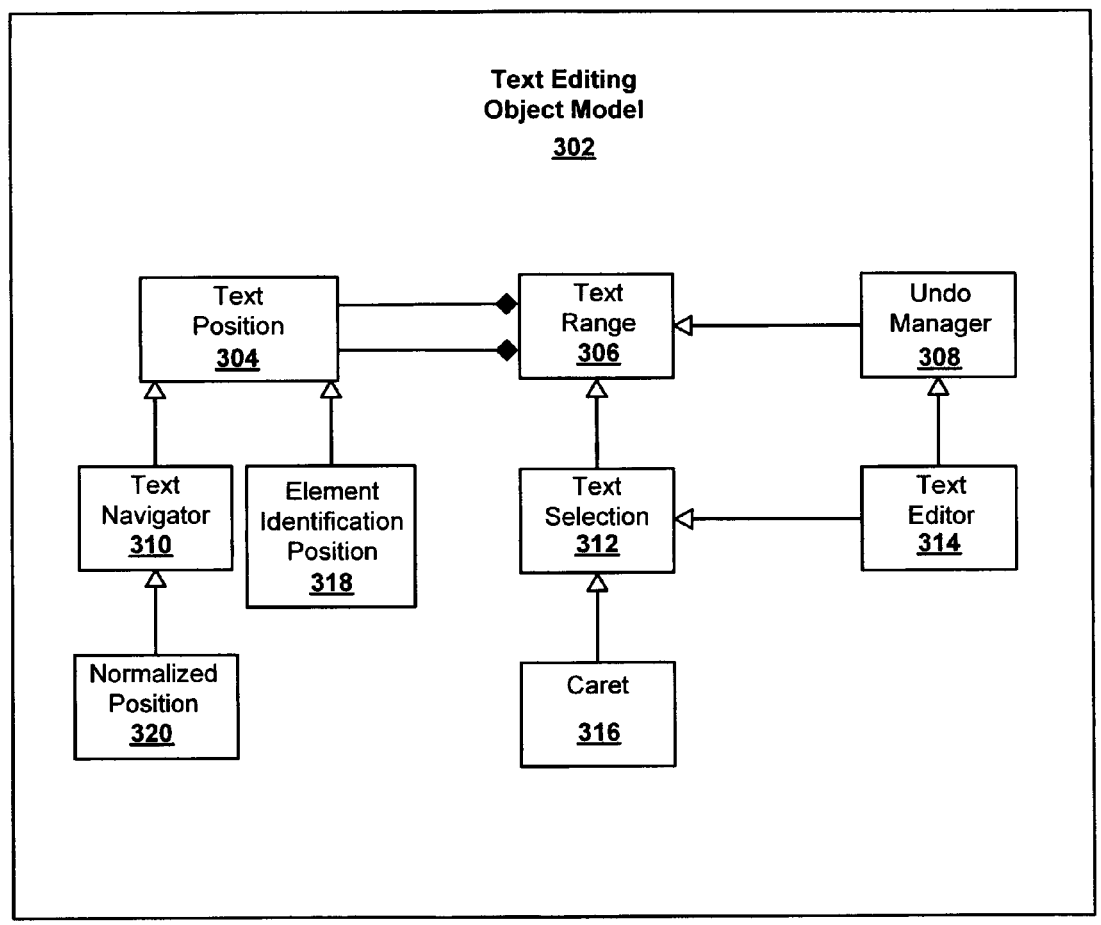
FIG. 3 is a block diagram generally representing an exemplary architecture of objects for providing editing operations of a text object model, in accordance with an aspect of the present invention.

FIG. 3 presents a block diagram generally representing an exemplary architecture of objects for providing editing operations of a text object model. Those skilled in the art will appreciate that the functionality implemented within the blocks illustrated in the diagram may be implemented as separate components or the functionality of several or all of the blocks may be implemented within a single component. As an example, the functionality of the undo manager 308 may be included in the text editor 314.

The text editing object model 302 may include a text position 304 that may be defined to be a pointer or reference to a location in the data abstraction. In general, a text position may be used to identify some content such as a character or embedded object. In one embodiment, an element identification position 318 may be defined as a derived class of a text postion for identifying elements in the data abstraction, such as a paragraph of text. A text navigator 310 may be a subclass of a text position that may be movable to point to any location so that it may be used in editing operations. In another embodiment, normalized position 320 may be defined as a derived class of text navigator that provides a position that has been moved to the closest location adjacent to a unit of content from the text navigator. This may allow the text navigator to be normalized to a location adjacent to a unit of content for ensuring predictable editing operations.

A text range 306 may be defined by two text positions and may identify some sequence of symbols between the two text positions in the data abstraction which may be subject to editing operations. In general, editing operations such as delete, insert, copy, make bold, and so forth which may be performed by the text editor 314 may be based upon a text range. A text range may include elements and subelements. A subelement is a subsequence of symbols within an element of the data abstraction. Text selection 312 may be a derived class of a text range that may provide a user interface visualization to the sequence of symbols between the two text positions defining the text selection. Text selection may augment a text range so that it may be used as a tool for an end user to communicate with the text editor. Moreover, text selection may have grab handles and other user interface modalities for accepting a user command. A caret 316 is a subclass of a text range that represents an empty text selection as an insertion point for adding text.

The text editor 314 may provide editing operations for a text selection 312 and the undo manager 308 may reverse an editing operation performed on a text range 306 by the text editor 314. The text editor may perform flow editing operations, such as splitting a structural element, based upon the concept of the data abstraction and a text range within the data abstraction. Unlike a typical tree-based implementation where, for example, normally a new node would be created and some elements would move from one node to another when a user splits a paragraph in two, the text editor may perform flow editing steps on the sequence of symbols to ensure propogating the appropriate context for the content of the elements and subelements within the text selection. In addition to the objects illustrated in FIG. 3, those skilled in the art may appreciate that the text editing object model may include more objects such as multiple editors for providing editing operations.

Figure 4:
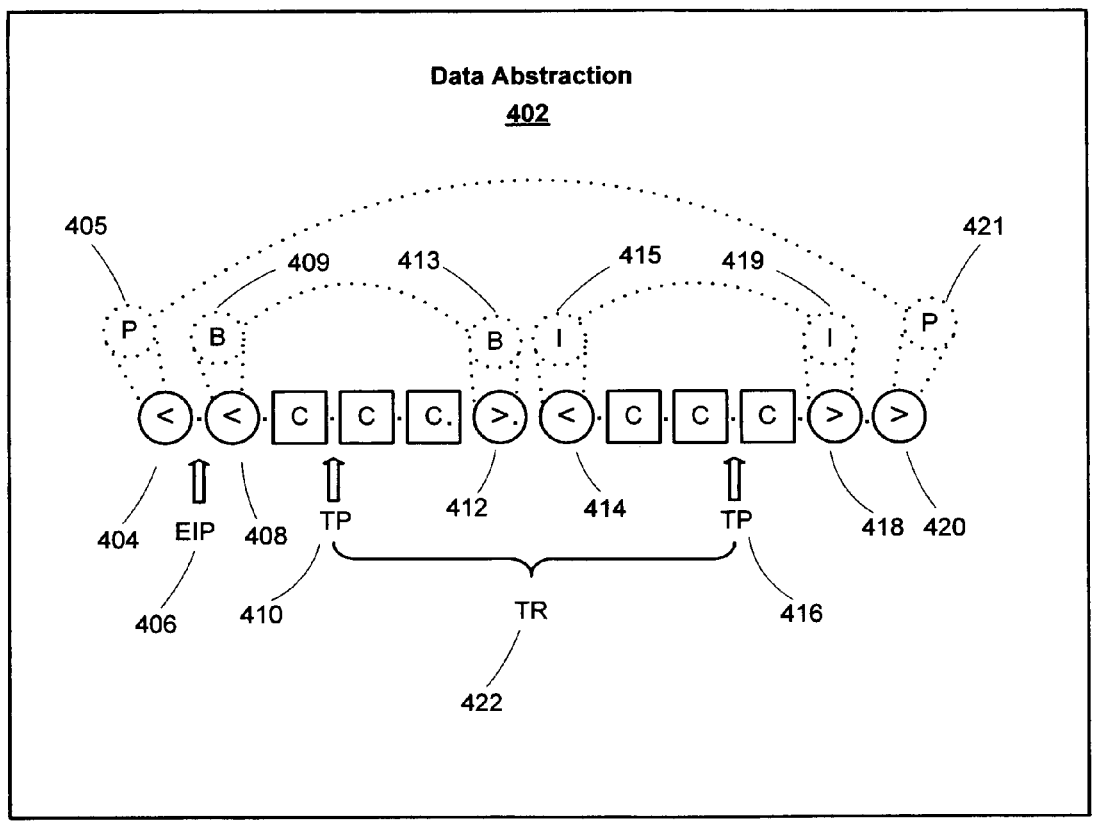
FIG. 4 is an exemplary illustration generally representing one embodiment for identifying positions, ranges, and elements in a data abstraction of the text object model, in accordance with an aspect of the present invention.

FIG. 4 presents an exemplary illustration generally representing one embodiment for identifying positions, ranges, and elements in a data abstraction of the text object model. Identifying positions in the sequence of symbols of the data abstraction is a fundamental operation for performing editing operations on content therein. For identifying positions, a text position may be defined to be a pointer or reference to a location in the sequence of symbols of the data abstraction. Text position 410 in FIG. 4 is illustrated to point to the location between the first two characters of the element beginning with the opening tag 408 and ending with the closing tag 412. Text position 416 is illustrated to point to the space between the last two characters of the element beginning with the opening tag 414 and ending with the closing tag of 418. In order to rely on a text position to point to a known location in the data abstraction, every undeleted symbol which is left of a text position remains to the left of the text position and every undeleted symbol which is right of a text position remains to the right of the text position. Thus a text position may be a reference to a location between two symbols of the data abstraction and, unlike a typical object reference, a text position does not point as a reference to a symbol in the data abstraction.

As a result, a text position may not be deleted from the data abstraction when it is a reference to a location between two symbols of content that are deleted. If any content is to be deleted from the sequence of symbols of the data abstraction, any text position pointing to a location within the content to be deleted will point to a location closest to the location of the deleted content after the content is deleted. Locations between symbols are not deleted when the symbols are deleted. Rather locations between deleted symbols may be merged during a deletion of content. In one embodiment, a location may be merged with the location adjacent to the closest remaining content. Thus, instead of being deleted along with content, a text position may remain in the sequence of symbols and consequently in the implementation data structure. In the case of inserted content, a text position may point to a location on the immediate left or right of the symbols inserted into the sequence of symbols of the data abstraction. In one embodiment, TextPositions may have a property called gravity which may specify whether the TextPosition may move to the immediate left or right of new content.

Also shown in FIG. 4 is a technique for identifying a range in the sequence of symbols of the data abstraction. A text range may be defined by a pair of text positions and serves to identify a content range. A content range means herein a subsequence of all symbols enclosed between a pair of text positions and may include elements and subelements. As illustrated in FIG. 4 for example, text range 422 is defined by the pair of text positions 410 and 416. Typically, editing operations performed by a text editor usually apply to a text range.

Finally, a technique for identifying elements in a sequence of symbols of the data abstraction is shown in FIG. 4. It may be important to be able to identify an element for many reasons. For instance, in order to provide an incremental update of a user view, it would be useful to be able to determine what content is the same and what content is new so that only the changes could be redrawn on the user display. In the embodiment of FIG. 4, opening tag 404 is illustrated to show that it has an associated property of a paragraph 405 as does closing tag 420 with illustrated associated property 421.

Together the pair of tags with their associated properties may indicate that they form an element that is a structural element, and more specifically, that the content of the element forms a paragraph. A formatting element is also formed by opening tag 408 and closing tag 412 both illustrated to show that they have an associated property, 409 and 413 respectively, for indicating formatting the content of the element in boldface. Similarly a formatting element is formed by opening tag 414 and closing tag 418 that are both illustrated to show that they have an associated property, 415 and 419 respectively, for indicating formatting the content of the element in italics.

To identify an element, an element identification position may be created as a reference to a location relative to the element in the sequence of symbols of the data abstraction. In one embodiment, an element identification position may be created as a reference to the location immediately before the element, such as element identification position 406 illustrated in FIG. 4. Element identification position 406 may then serve to identify the element beginning with opening tag 408 and ending with closing tag 412. In another embodiment, an element identification position may be created as a reference to the location immediately after the element. Because an element identification position may be defined by position, it may inherit all properties of positions. Moreover, if the element is extracted from the sequence of symbols, the element identification position may remain as a reference to a location in the sequence of symbols of the data abstraction.

Figure 5A:
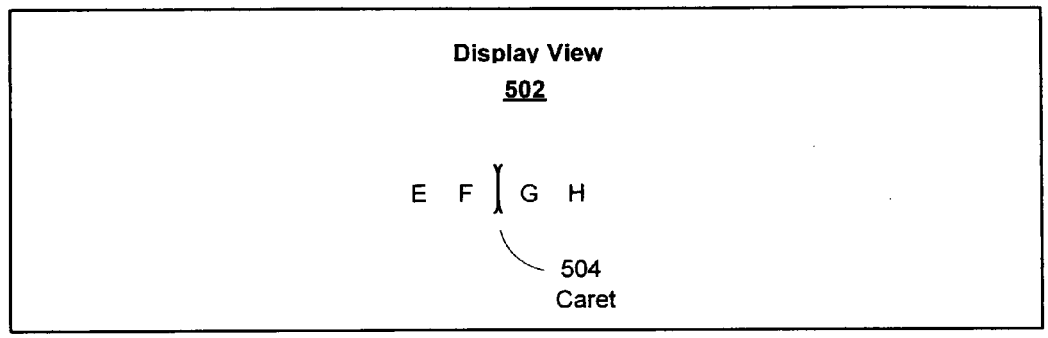
FIGS. 5A-5C are exemplary illustrations generally representing one embodiment for position normalization in a data abstraction of the text object model, in accordance with an aspect of the present invention.
Figure 5B:
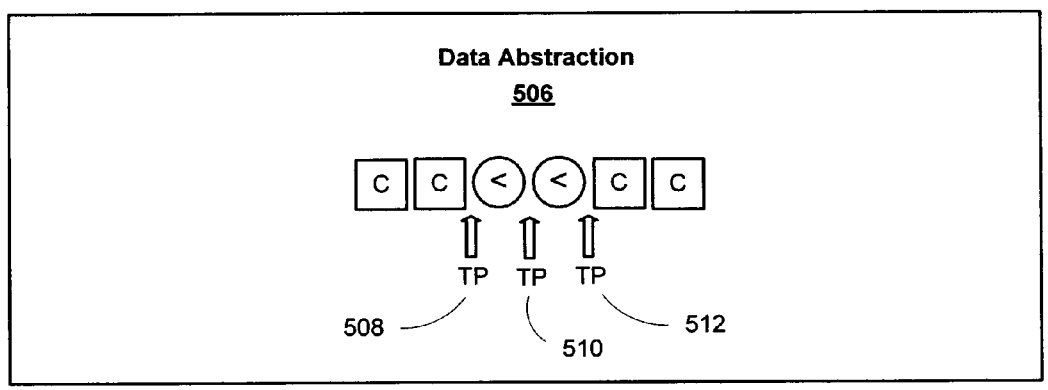
Figure 5C:
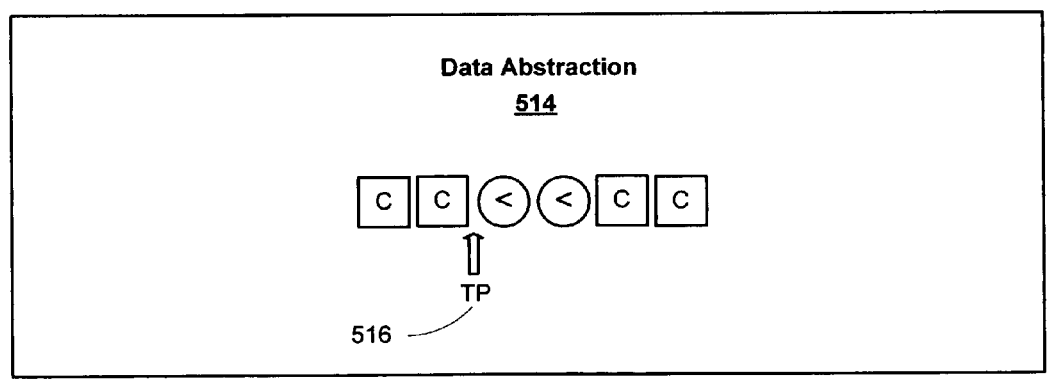

FIGS. 5A-5C present exemplary illustrations generally representing one embodiment for position normalization in a data abstraction of the text object model. FIG. 5A illustrates four characters of display view 502 that may be displayed to a user. A caret 504 is positioned as an insertion point in the middle of the four characters on the display. FIG. 5B illustrates a sequence of symbols in data abstraction 506 that may correspond to the display view 502. In FIG. 5B, there are illustrated two opening symbols between the four character symbols which correspond to the four character symbols of the display view of FIG. 5A. Although there is only one space between the two characters in the display view 502 for positioning the caret 504 as an insertion point, there are three locations between the two corresponding characters in the sequence of symbols of data abstraction 506 which may be referenced by a text position of a corresponding insertion point. For instance, a corresponding insertion point could be text position 508, text position 510 or text position 512. In order to resolve the ambiguity between the display view perception of one insertion location and the three locations in the data abstraction, the text position for the insertion point in the data abstraction may be normalized to any of the three locations.

In one embodiment, the text position may be normalized by skipping all formatting symbols in either a forward or backward direction to a location adjacent to the first non-formatting symbol. Assuming both opening tags in FIG. 5B have associated properties for formatting symbols, there may be two normalized candidate positions in this embodiment of position normalization given the three possible text positions in FIG. 5B: one in a forward direction, text pointer 508, and one in the backward direction, text pointer 512. The opening and closing tags for structural elements are non-formatting symbols and therefore this embodiment of position normalization treats opening and closing tags for structural elements the same as character symbols. Thus, a text pointer may also be normalized to a location adjacent to an opening or closing tag for a structural element.

In another embodiment, the text position for an insertion point may be normalized by skipping all formatting symbols to a location adjacent to the logically previous character symbol. The logically previous character symbol means that character symbol which was the most recent character symbol entered, independent of the direction of the language input, for example, whether typing from right to left or left to right. Assuming the direction of the language input was from left to right, FIG. 5C illustrates this embodiment of position normalization by normalizing the insertion point to text position 516. This embodiment may produce a behavior typical for most editors which may allow a user to continue to input character using the same formatting as that used for the logically previous character entered.

In yet another embodiment, there may be a text selection made instead of making an insertion point. Unlike the caret which may represent an empty text selection as an insertion point for adding text, the text selection may have two text positions between which are a sequence of symbols. In this embodiment, each of the two text positions may be respectively normalized inward by skipping all formatting symbols from each location at the end of the text range to a location adjacent to the first non-formatting symbol within the text range. The text position on the left of the text selection may be normalized by skipping all formatting symbols in a rightward direction to a location adjacent to the first non-formatting symbol. And the text position on the right of the text selection may be normalized by skipping all formatting symbols in a leftward direction to a location adjacent to the first non-formatting symbol.

Figure 6:
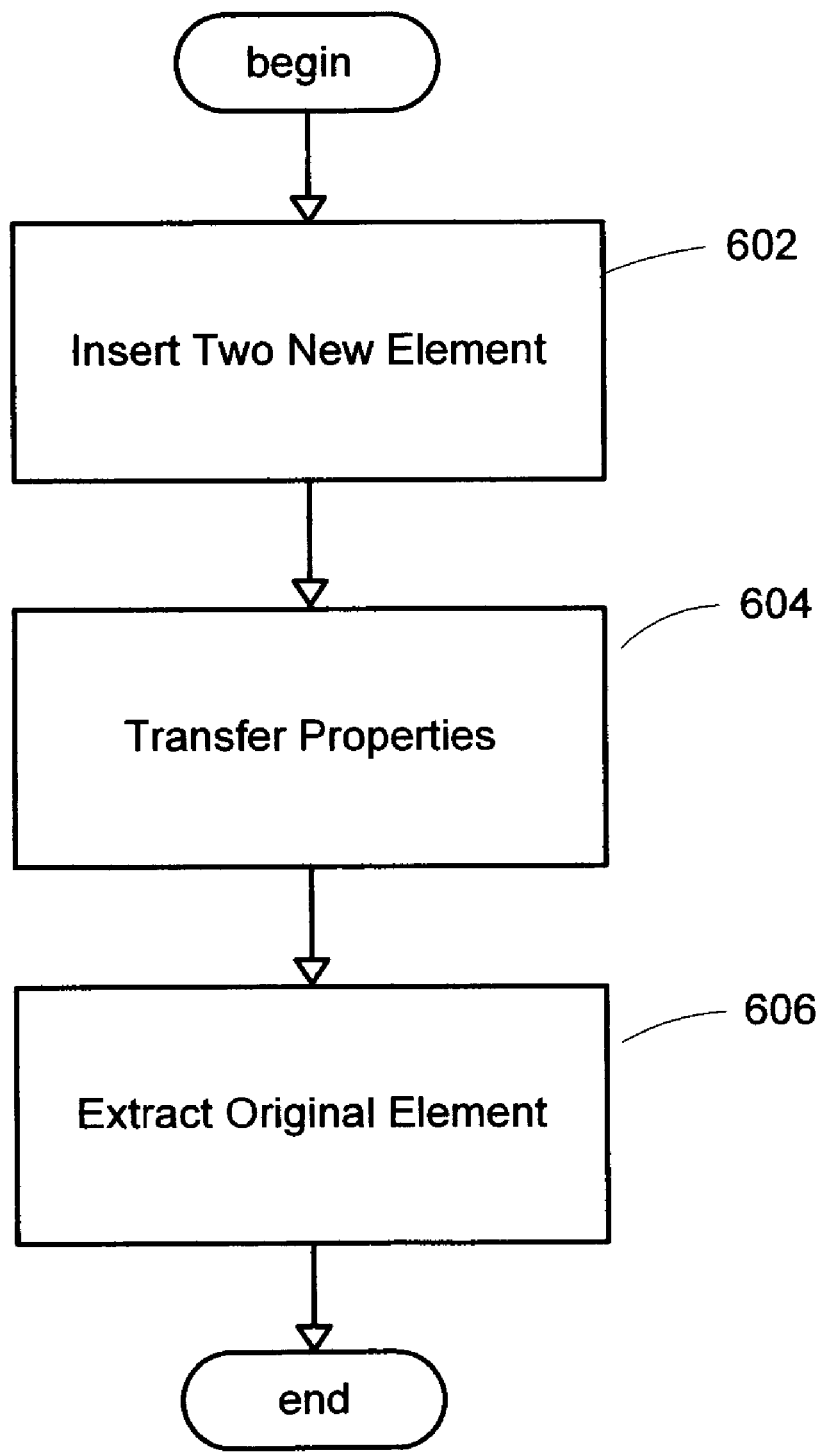
FIG. 6 is a flowchart generally representing example steps undertaken for splitting an element within the sequence of symbols of the data abstraction, in accordance with an aspect of the present invention.
Figure 7A:
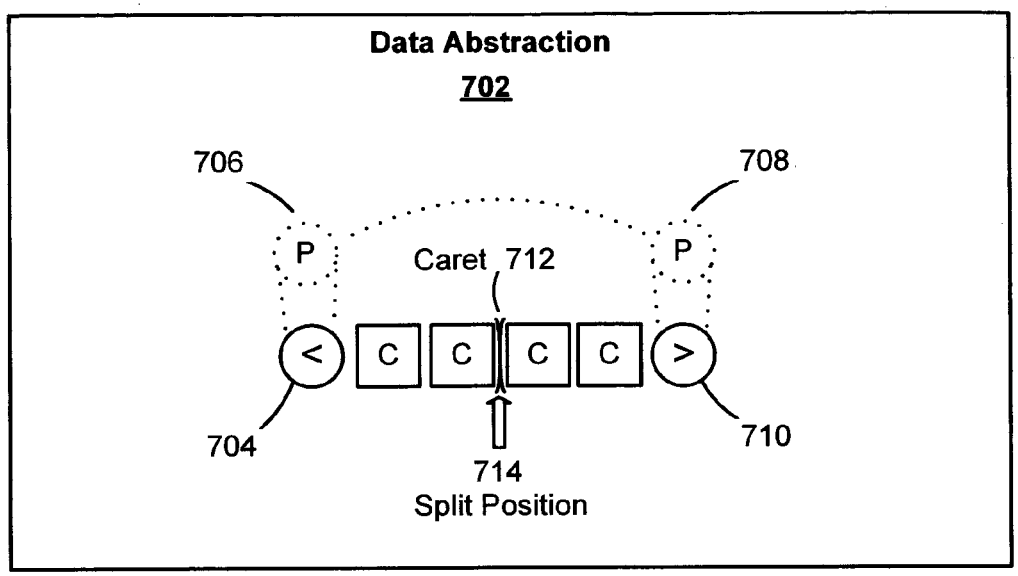
FIGS. 7A-7C are exemplary illustrations generally representing the sequence of symbols of the data abstraction during different steps of splitting an element, in accordance with an aspect of the present invention.

FIG. 6 presents a flowchart generally representing example steps undertaken for splitting an element within the sequence of symbols of the data abstraction. For instance, FIG. 7A illustrates data abstraction 702 with a sequence of symbols beginning with an opening tag 704 followed by four characters and then a closing tag 710. The opening and closing tags have associated properties, 706 and 708 respectively, that may indicate that the content of the element forms a paragraph. An operation for splitting the paragraph into two paragraphs may be initiated if a user for example presses the enter key with the caret 712 positioned at a split position 714 between the third and fourth characters. An operation for splitting the paragraph means that the paragraph element may be split into two paragraph elements with the first element including the content of the original paragraph occurring before the split position and the second element including the content of the original paragraph occurring after the split position.

Figure 7B:
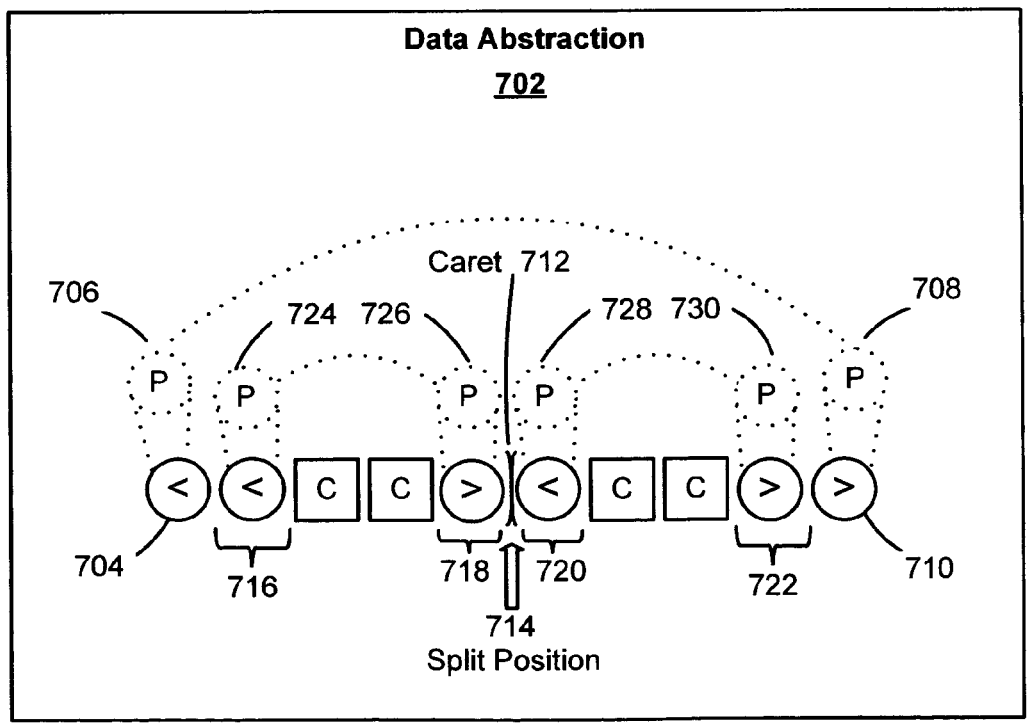

At step 602 of FIG. 6, two new elements may first be inserted into the sequence of symbols. One element may be inserted around the content of the original element occurring before the split position and another element may be inserted around the content of the original element occurring after the split position. The first new element inserted begins at the location immediately after the opening tag of the original element and ends at the location of the split position. The second new element inserted begins at the location of the split position and ends at the location immediately before the closing tag of the original element. FIG. 7B illustrates data abstraction 702 with two new elements inserted in the sequence of symbols. The opening tag 716 of the first new element may be inserted immediately after the opening tag 704 of the original element and the closing tag 718 of the first new element may be inserted immediately before the split position 714. The opening tag 720 of the second new element may be inserted immediately after the split position 714 and the closing tag 722 of the second new element may be inserted immediately before the closing tag 710 of the original element. The second element is inserted around the content of the original element occurring after the split position.

At step 604, properties of the original element may be transferred to the two new elements. When splitting an element, the two new elements may inherit properties of the original element. For example, opening tag 704 and closing tag 710 in FIG. 7B may have associated properties 706 and 708 respectively for formatting a paragraph, such as alignment, borders, spacing and so forth. These properties may be transferred as associated properties to the two new elements inserted into the sequence of symbols of data abstraction 702. The associated properties 706 may be copied as associated properties 724 of opening tag 716 of the first new element and associated properties 708 may be copied as associated properties 726 of closing tag 718 of the first new element. Likewise, the associated properties 706 may be copied as associated properties 728 of opening tag 720 of the second new element and associated properties 708 may be copied as associated properties 730 of closing tag 722 of the second new element.

Figure 7C:
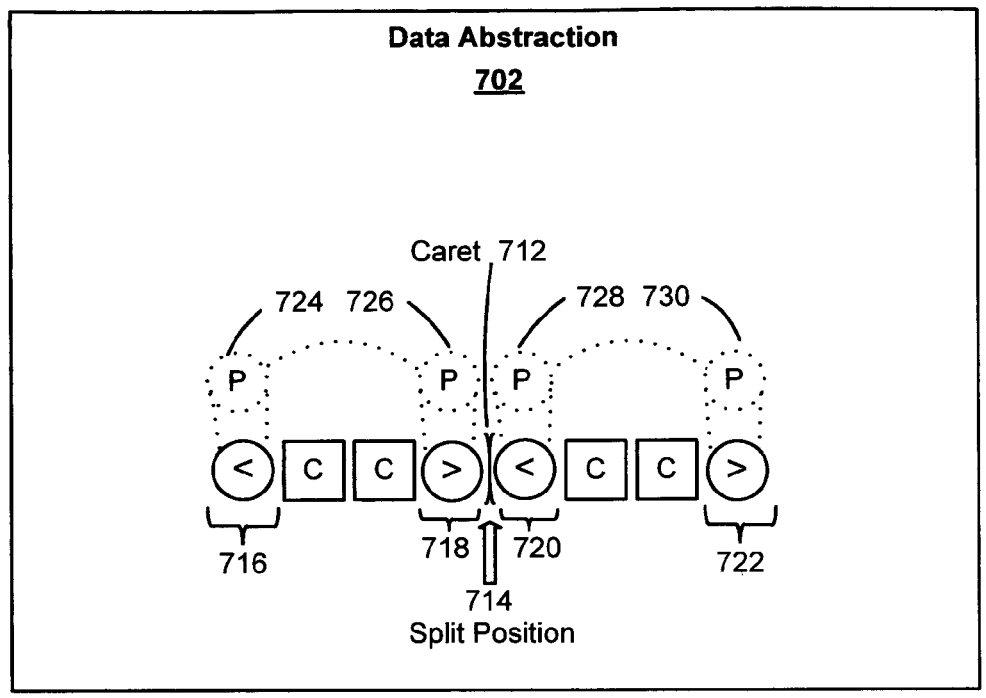

Finally, at step 606 the opening and closing tags of the original element may be extracted from the sequence of symbols of the data abstraction. FIG. 7C illustrates data abstraction 702 after the opening and closing tags of the original element have been extracted from the sequence of symbols. After the tags of the original element have been extracted from the sequence of symbols of the data abstraction, the steps for splitting an element are finished. The resulting data abstraction may now have two new elements that have replaced the original element.

Figure 9A:
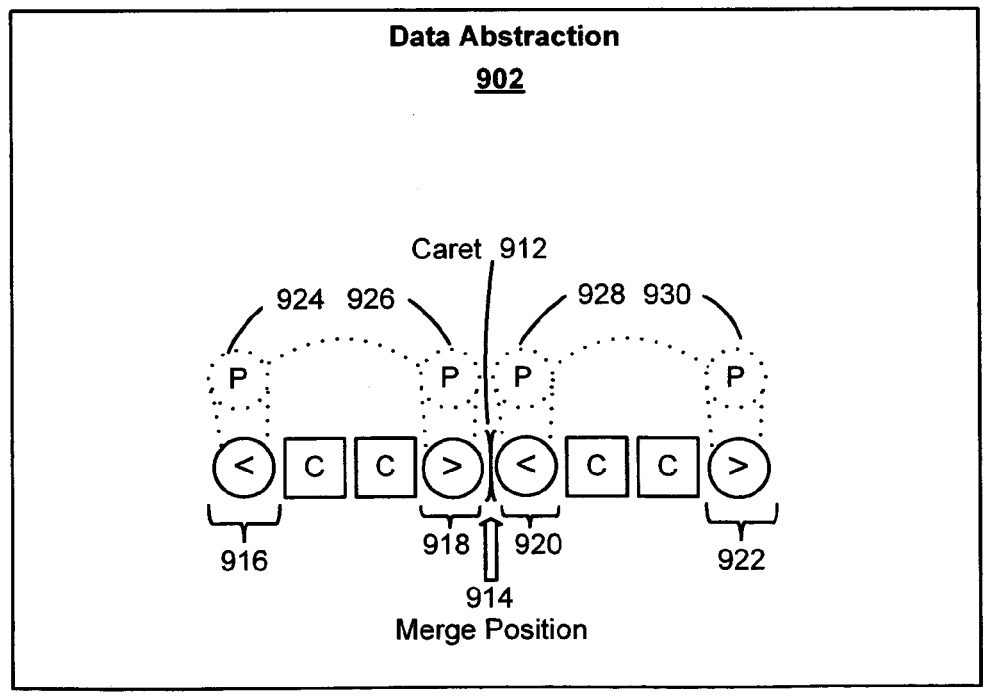
FIGS. 9A-9C are exemplary illustrations generally representing the sequence of symbols of the data abstraction during different steps of merging two similar elements, in accordance with an aspect of the present invention.
Figure 8:
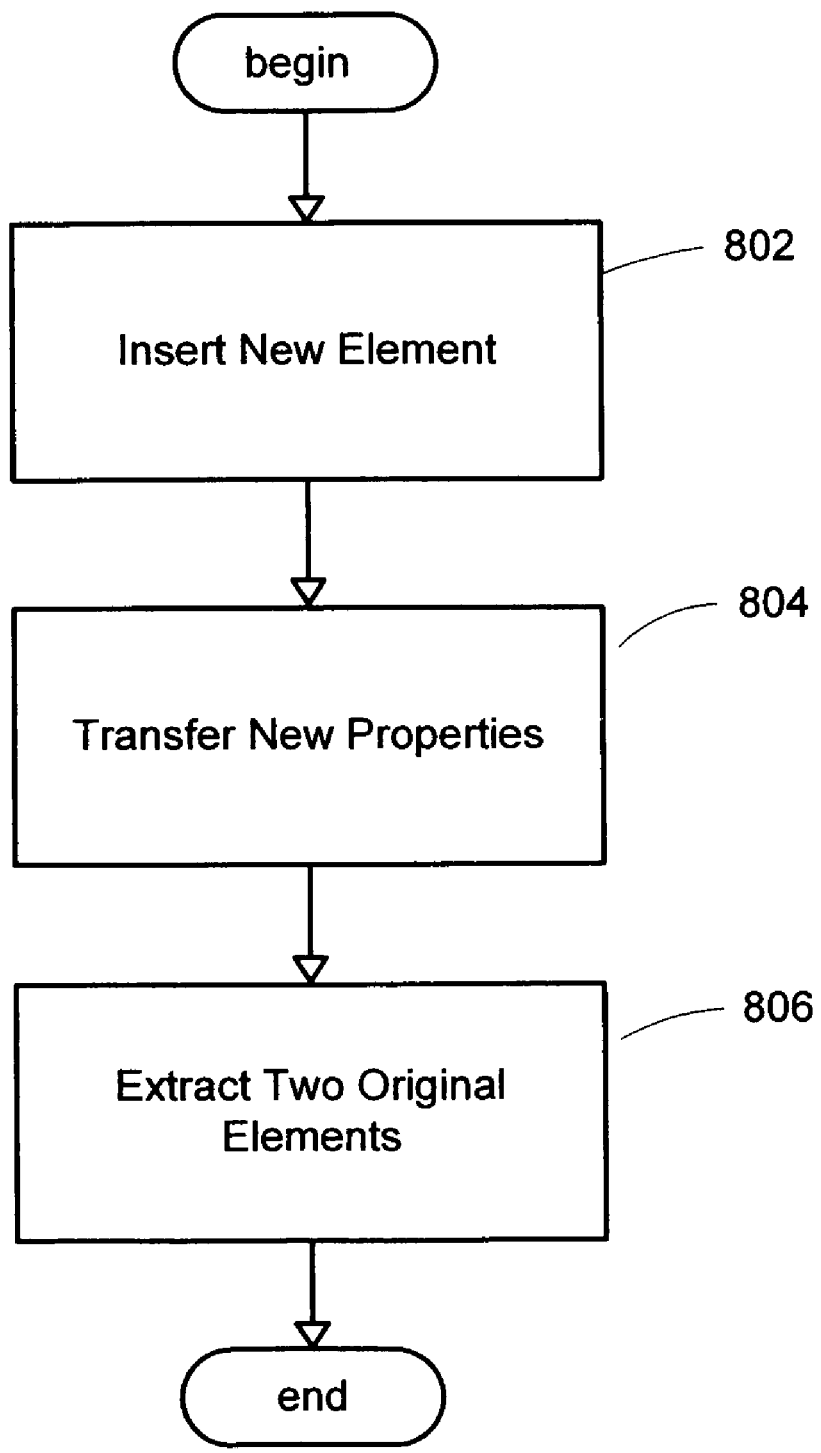
FIG. 8 is a flowchart generally representing example steps undertaken for merging two similar elements within a sequence of symbols of the data abstraction, in accordance with an aspect of the present invention.

FIG. 8 presents a flowchart generally representing example steps undertaken for merging two similar elements within a sequence of symbols of the data abstraction. For instance, FIG. 9A illustrates data abstraction 902 with a sequence of symbols beginning with a first element having an opening tag 916 before two characters followed by a closing tag 918 and followed by an adjacent second element having an opening tag 920 before two characters followed by a closing tag 922. The opening and closing tags of the first element and the second element have associated properties, 924, 926, 928 and 930 respectively, that may indicate that the content of each element forms a paragraph. An operation for merging the two paragraphs into one paragraph may be initiated if a user presses the delete key with the caret 912 positioned, for example, at the end of a paragraph which may be located in FIG. 9A at a merge position 914 between the closing tag 918 of the first element and the opening tag 920 of the second element. An operation for merging two paragraphs means that the two paragraph elements may be merged into one paragraph element that includes the content of the two original paragraphs.

Figure 9B:
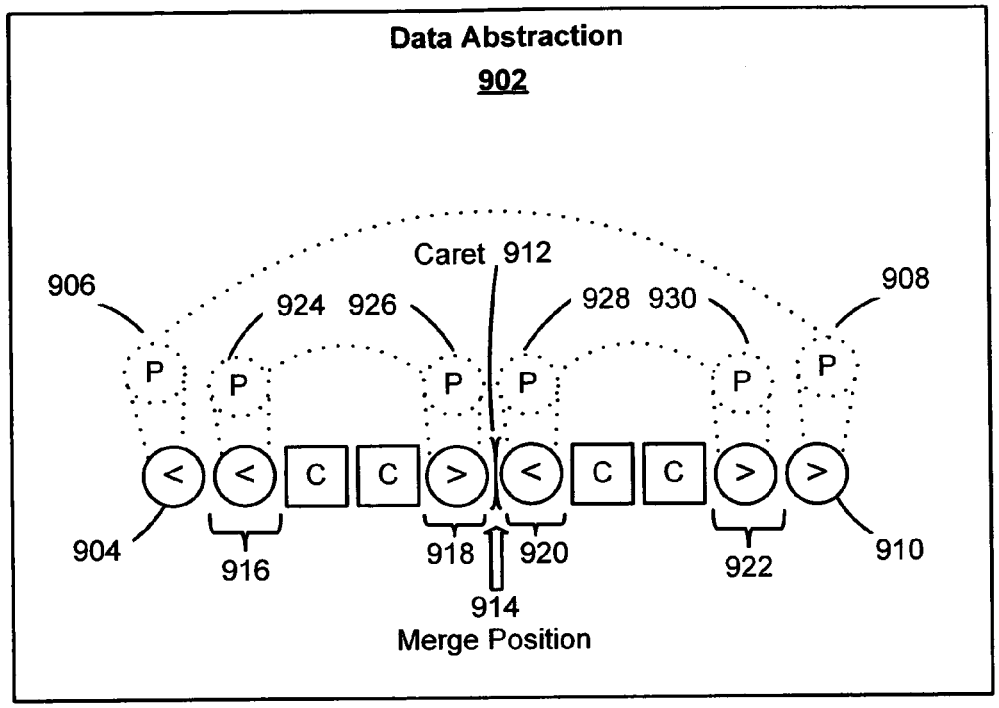

At step 802 of FIG. 8, a new element may first be inserted into the sequence of symbols. The new element may be inserted to enclose the two original elements by inserting the opening tag of the new element immediately before the opening tag of the first original element and inserting the closing tag of the new element immediately after the closing tag of the second original element. FIG. 9B illustrates data abstraction 902 with the new element inserted in the sequence of symbols so that it encloses the two original elements. The opening tag 904 of the new element may be inserted immediately before the opening tag 916 of the first original element and the closing tag 910 of the new element may be inserted immediately after the closing tag 922 of the second original element.

At step 804, properties of the two original elements may be transferred to the new element. When merging an element, the new element may inherit the properties of either of the two original elements. Because the two original elements may have two different sets of properties, choosing which set of properties to inherit may depend upon the operation. In general, an operation may normally copy the properties of the first original element. However, certain operations could prefer to copy the properties of the second element. In an exemplary embodiment, the new element may inherit the properties of the first original element. For instance, opening tag 916 and closing tag 918 forming the first original element in FIG. 9B may have associated properties 924 and 926 respectively for formatting a paragraph, such as alignment, borders, spacing and so forth. These properties may be transferred as associated properties to the new element inserted into the sequence of symbols of data abstraction 902. The associated properties 924 may be copied as associated properties 906 of opening tag 904 of the new element and associated properties 926 may be copied as associated properties 908 of closing tag 910 of the new element.

Figure 9C:
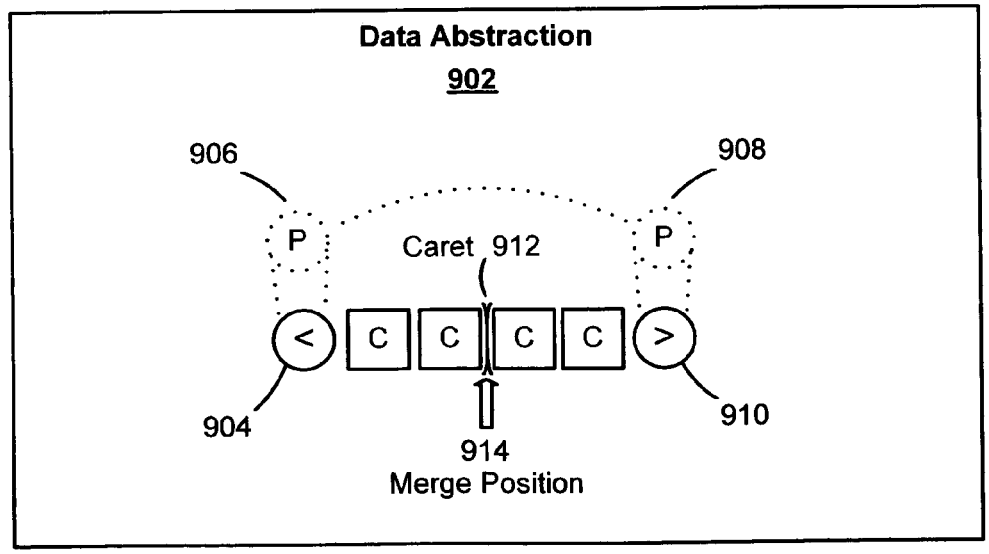

Finally, at step 806 the opening and closing tags of the two original elements may be extracted from the sequence of symbols of the data abstraction. FIG. 9C illustrates data abstraction 902 after the opening and closing tags of the two original elements, 916, 918, 920 and 922 respectively, have been extracted from the sequence of symbols. After the tags of the original element have been extracted from the sequence of symbols of the data abstraction, the steps for merging two elements are finished. The resulting data abstraction may now have one element that has replaced the two original elements and that element may include the content of the two original elements.

Figure 10:
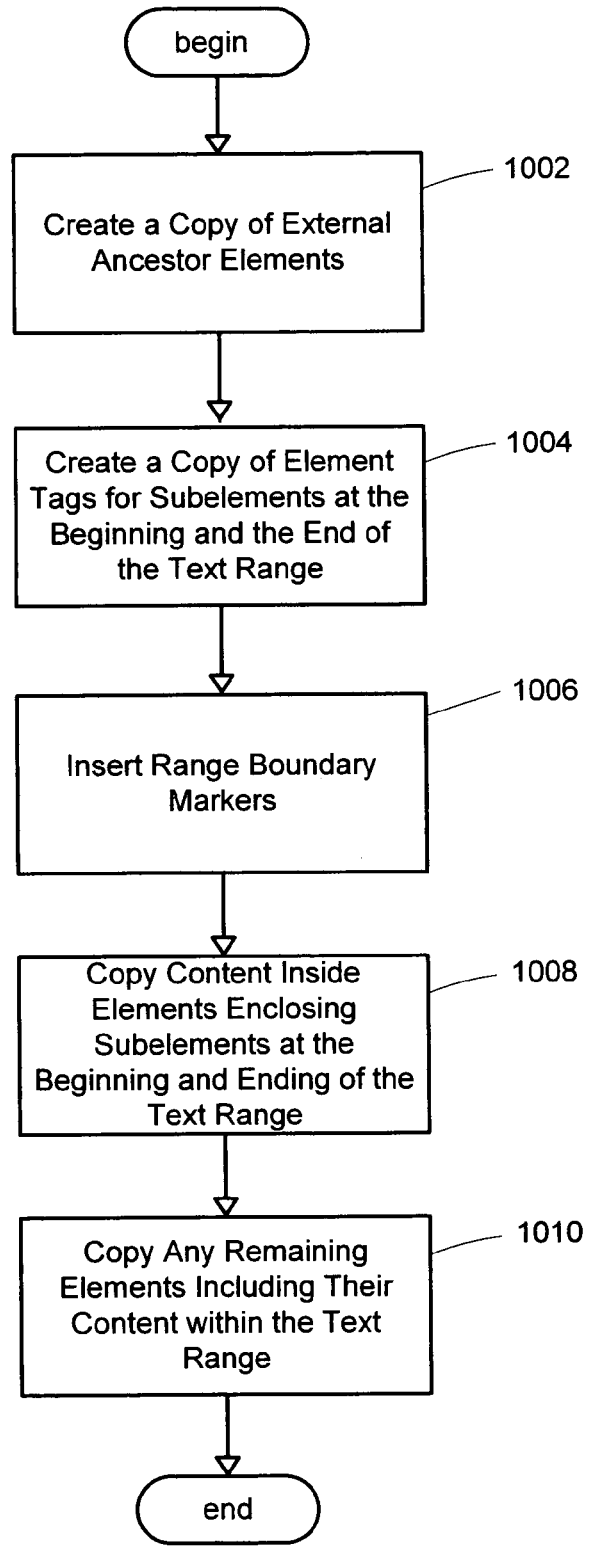
FIG. 10 is a flowchart generally representing example steps undertaken for copying content within a sequence of symbols of the data abstraction, in accordance with an aspect of the present invention.
Figure 11:
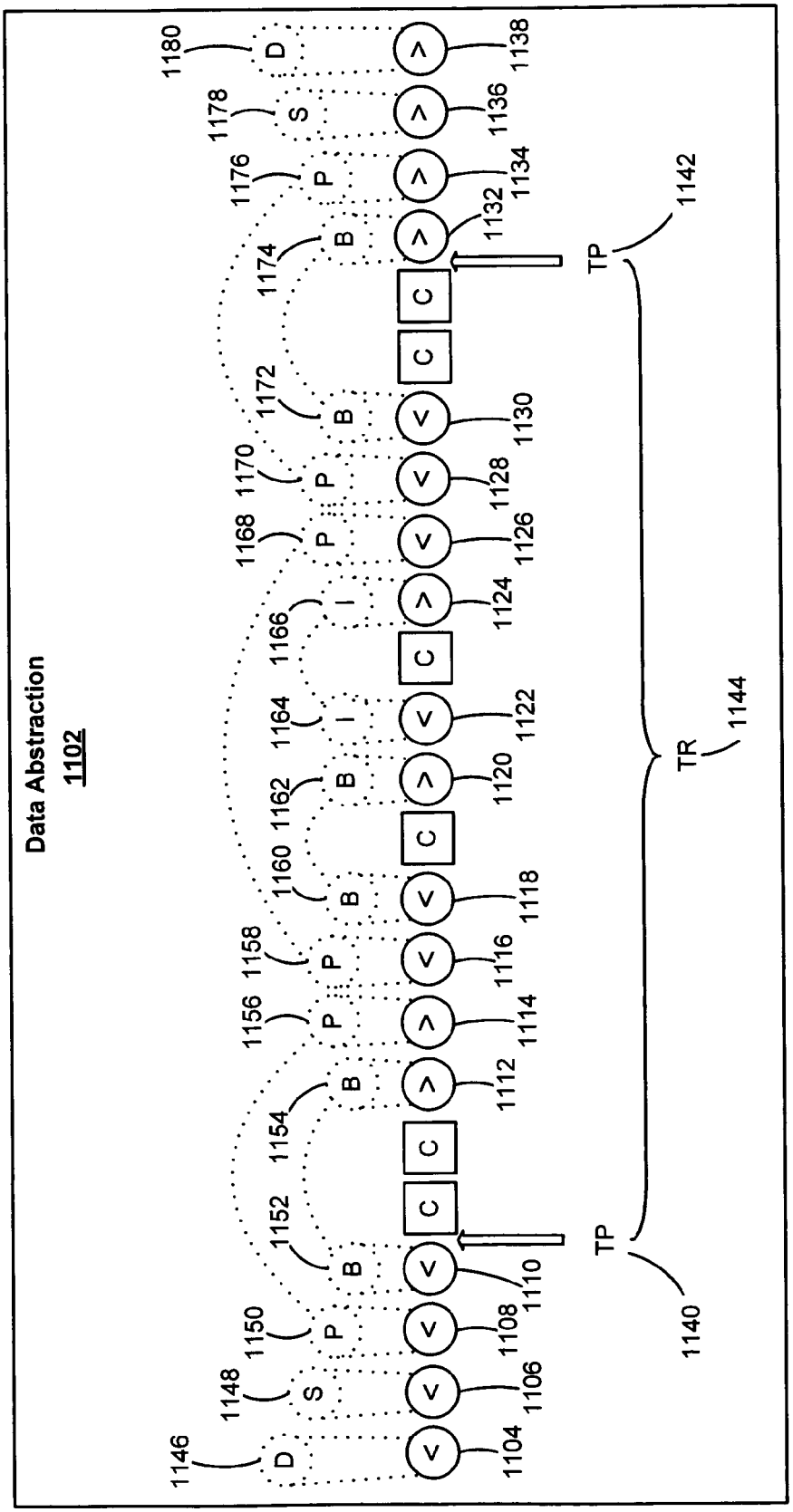
FIG. 11 is an exemplary illustration generally representing a text range in the data abstraction to be copied, in accordance with an aspect of the present invention.

FIG. 10 presents a flowchart generally representing example steps undertaken for copying content within a sequence of symbols of the data abstraction. For instance, FIG. 11 illustrates data abstraction 1102 with a sequence of symbols that includes three elements formed by pairs of opening and closing tags, 1108 and 1114, 1116 and 1126, and 1128 and 1134 respectively. A user may make a text selection that may result in text range 1144 which begin in the middle of the first element at text position 1140, includes the second element and ends in the middle of the third element at text position 1142. A user may then, for example, proceed to copy this text selection. In order to properly form a copy of the content, the formatting and structure of the text selection may be propagated to the copy of the text selection.

Figure 12A:
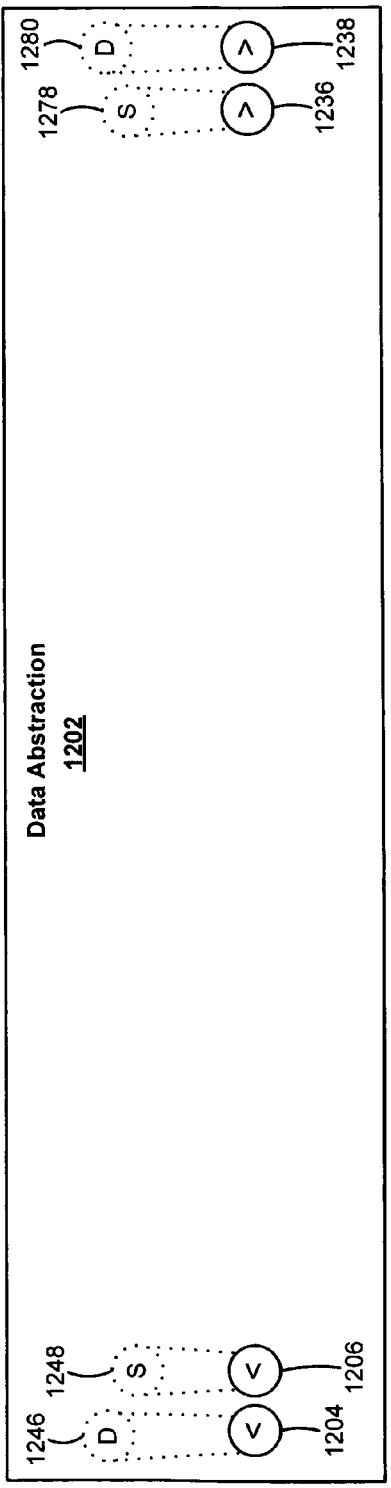
FIGS. 12A-12E are exemplary illustrations generally representing a copy of a text range in the data abstraction during different steps of copying content of a text range, in accordance with an aspect of the present invention.

At step 1002 of FIG. 10, the opening and closing tags of external ancestor elements may be copied as the first step in making a copy of the text range. An external ancestor element as used herein means an element that encloses any subelements and elements within the text range. In making a copy of the external ancestor element, the associated properties of the opening and closing tags may also be copied. This advantageously may propagate the formatting and structure of the text selection to create a well-formed copy. FIGS. 12A-12E illustrate stages of forming a copy of the text range as a sequence of symbols of data abstraction 1202 according to the steps of FIG. 10. FIG. 12A illustrates a copy of the opening and closing tags of the external ancestor elements of the text range 1144 after completing the first step 1002. For example, the nearest ancestor element enclosing text range 1144 is formed by opening tag 1106 and closing tag 1136. This nearest ancestor element has associated properties 1148 and 1178 indicating the content enclosed within this element forms a section of a document. Opening tag 1206, associated property 1248, closing tag 1236, and associated property 1278 are respectively copied from opening tag 1106, associated properties 1148, closing tag 1136, and associated property 1178. The second closest ancestor element of text range 1144 is formed by opening tag 1104 and closing tag 1138 with associated properties 1146 and 1180 indicating that the content enclosed within this element forms a document. Opening tag 1204, associated property 1246, closing tag 1238, and associated property 1280 are respectively copied from opening tag 1104, associated properties 1146, closing tag 1138, and associated property 1180.

Figure 12B:
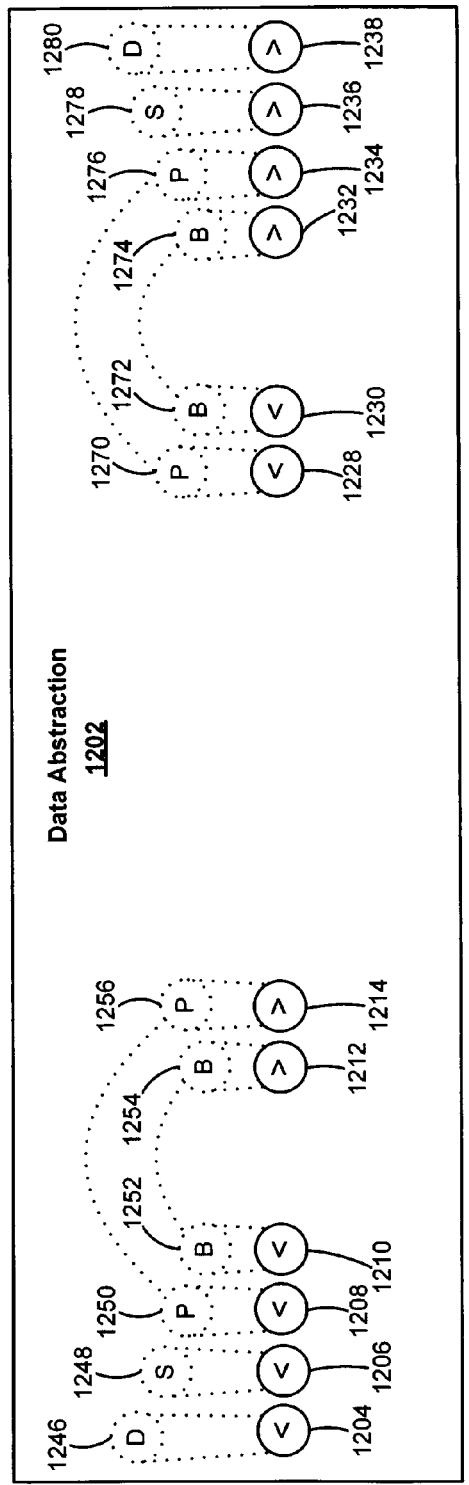

At step 1004, opening and closing element tags enclosing any subelements at the beginning and the end of the text range may be copied. These element tags may be inserted into the copy of the text range adjacent to the copied ancestor element tags. FIG. 12B illustrates two pairs of opening and closing element tags, 1208 and 1214 along with 1210 and 1212, copied respectively from opening and closing tags 1108 and 1114 along with 1110 and 1112 for the subelement at the beginning of the text range 1144. And FIG. 12B also illustrates two pairs of opening and closing element tags, 1228 and 1234 along with 1230 and 1232, copied respectively from opening and closing element tags 1128 and 1134 along with 1130 and 1132 for the subelement at the end of the text range 1144. Note that the associated properties for each of these tags, namely 1250, 1252, 1254, 1256, 1270, 1272, 1274, and 1276 were also copied respectively from associated properties 1150, 1152, 1154, 1156, 1170, 1172, 1174, and 1176.

Figure 12C:
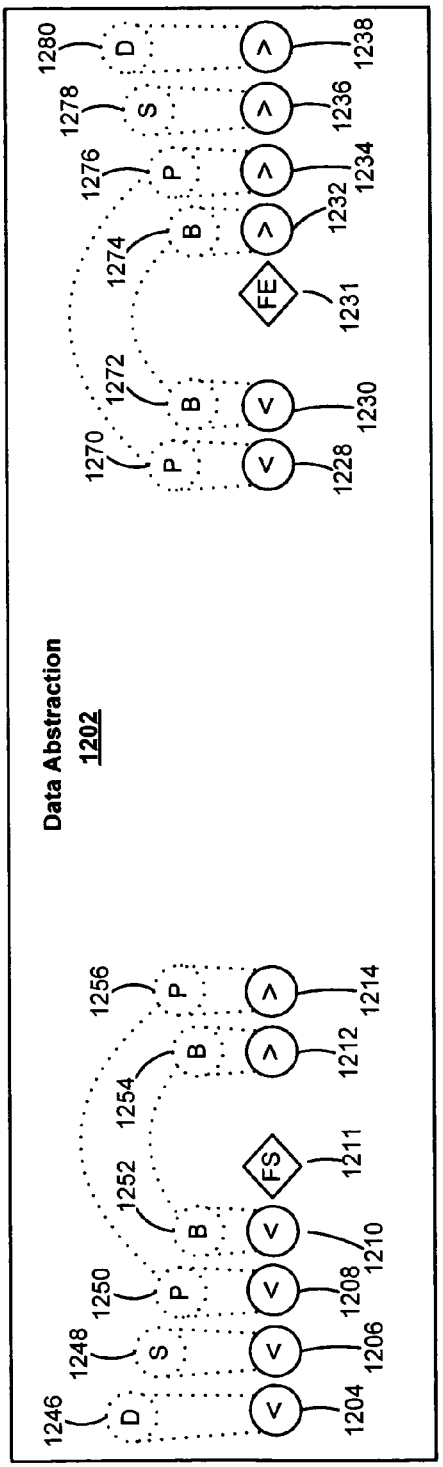

In order to indicate where content started and ended, range boundary markers may be inserted at step 1006 into the copy of the text range adjacent to the tags copied from the tags closest to each of the two locations referenced by the two text pointers that define the text range being copied. Because the selected content may belong to subelements, the markers which indicate where content started and ended cannot be represented by opening and closing tags which may represent the beginning and ending of a particular element. In one embodiment, the markers may be XML comments which may be named fragment start and fragment end. Fragment start may be a marker preceding any selected content copied and fragment end may be a marker following any selected content copied. FIG. 12C illustrates range boundary marker 1211 inserted adjacent to tag 1210 that was copied from tag 1110 which is closest to the location reference by text pointer 1140 which precedes the content selected. FIG. 12C also illustrates range boundary marker 1231 inserted adjacent to tag 1232 that was copied from tag 1132 which is closest to the location referenced by text pointer 1142 which follows the content selected.

Figure 12D:
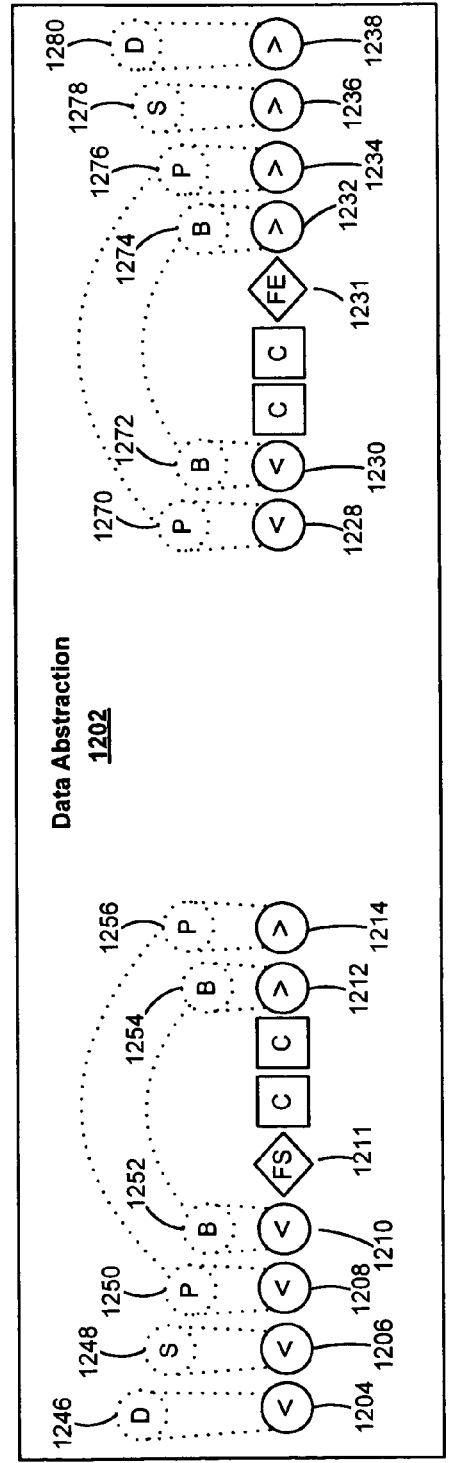

At step 1008, the content within the opening and closing element tags enclosing any subelements at the beginning and the end of the text range may next be copied. This content may include the sequence of symbols that are characters or embedded objects. For example, FIG. 12D illustrates content copied from the subelement at the beginning of the text range to be copied to the copy of the text range between range boundary marker 1211 and closing tag 1212. FIG. 12D also illustrates content copied from the subelement at the end of the text range to be copied to the copy of the text range between opening tag 1230 and range boundary marker 1231.

Figure 12E:
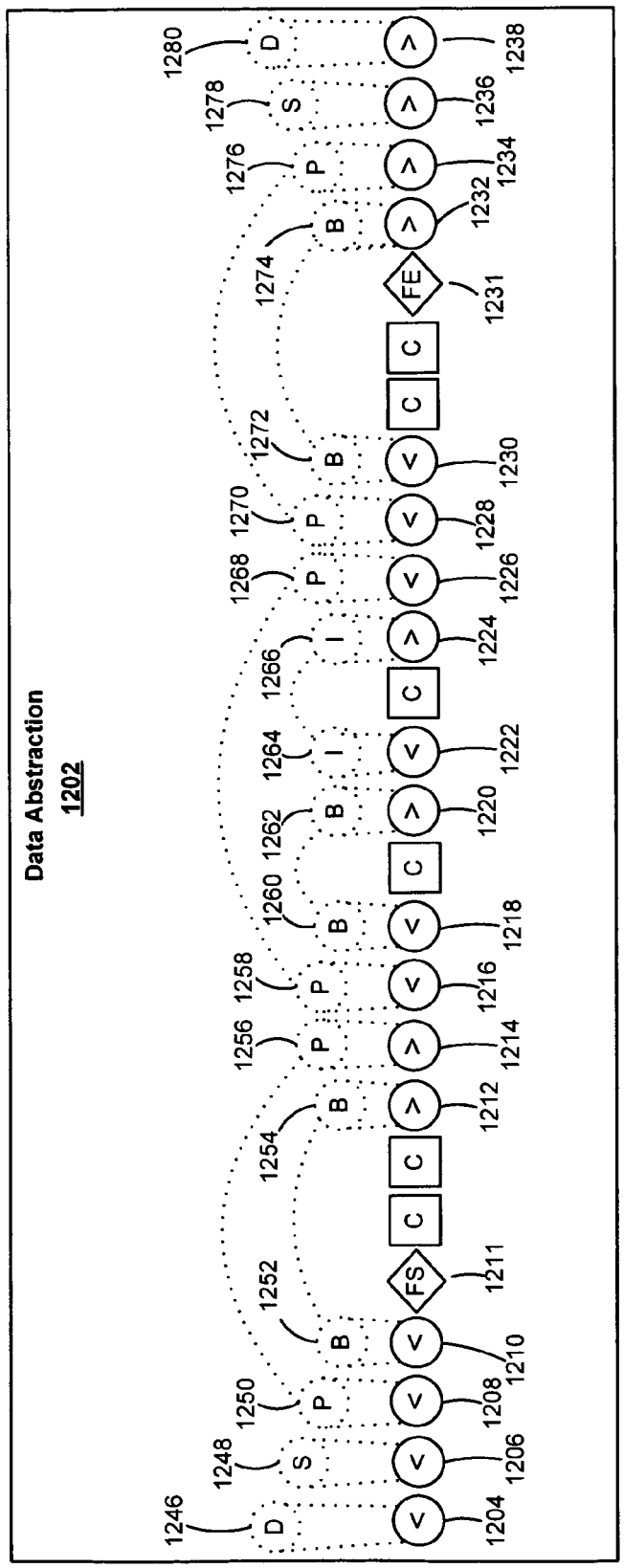

Finally, at step 1010 any uncopied elements within the text range and their content may be copied. FIG. 12E illustrates the copy of the text range with the remaining element formed by opening tag 1216 and closing tag 1226 copied into the sequence of symbols. As a result of this process, the copy of the text range illustrated in FIG. 12E is syntactically well-formed. Each opening tag has its respective closing tag.

Additional editing operations may in turn use these editing operations to manipulate both elements and subelements of content within a data abstraction. Such editing operations that may manipulate subelements may advantageously support selection of content independent of element boundaries. For example, content may be selected starting with a portion of content within an element, including several different elements, and ending with a portion of content within yet another element. The editing operations of the text editing object model described may manipulate any data structure implementing the data abstraction of the text object model.

As can be seen from the foregoing detailed description, the present invention provides an improved system and method for editing operations of a text object model. The text object model may have a data abstraction represented by a sequence of symbols and may provide a formatted text programming interface. The architecture of the present invention provides a text editor for performing editing operations on the data abstraction using the formatted text programming interface. The editing operations may include splitting an element of the data abstraction into two elements, merging two elements of the data abstraction into one element, copying a text range of the data abstraction, and other operations on a text range that may include a subelement within the text range. Moreover, the system and method may support editing operations for any number of applications including form editing applications, text editors, web publishing applications, document processing, that may involve document or form processing. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for editing a layout containing flowing text content with a text editor, the layout including intermingled text elements and non-text elements, the data abstraction abstracting the implementation data structure for the flowing text content from the text editor such that the text editor does not have specific knowledge of the implementation of the flowing text content, the flowing text content being divisible into a plurality of text elements, each text element potentially appearing in any of a plurality of different places in the layout, the system comprising:

a computer processor; and computer memory storing the following:

a text object model, the text object model comprising:

a data abstraction representing the flowing text content, the data abstraction including a sequence of symbols that can be separated into different text elements, each symbol having a location between the symbol and each adjacent symbol, wherein each location is independent from the adjacent symbols, text elements defined by text ranges having a first location and a second location and including symbols located between the first location and the second location such that the flowing text content can be separated into the different text elements to more easily process editing operations to the flowing text content when the flowing text content is to flow around non-text elements in the layout; and a formatted text programming interface, the formatted text programming interface configured to interoperate with text editors to receive input from text editors, the input indicating editing operations that are to be performed on text elements within the flowing text content;

the implementation data structure operably coupled to the text object model, the implementation data structure implementing the layout, including implementing the data abstraction representing the flowing text content, and including any non-text elements, for visual output;

a text editing object model operably coupled to the text object model for performing editing operations on the data abstraction representing the flowing text content, the text editing object model comprising:

a text editor, the text editor operably coupled to the formatted text programming interface of the text object model, the text editor configured to:

receive input for flow editing operations according to corresponding text ranges within the data abstraction rather than symbols, the flow editing operations indicating text ranges for modifying text elements relative to non-text elements within the layout; and perform flow editing operations to modify text elements relative to non-text elements within the layout based on the corresponding text ranges rather than symbols, flow editing operations including splitting the flowing text content into different text elements based upon the data abstraction and corresponding text ranges such that the text editor performs flow editing operations directly on the corresponding text ranges, performing flow editing operations directly on corresponding text ranges ensuring that appropriate context for the different text elements is propagated to the to different text elements without having to add data to the implementation data structure; and display an updated user view of the layout, the updated user view of the layout visually reflecting the results of the edit operation, the updated user view of the layout intermingling the relevant text elements with non-text elements in accordance with the propagated context; and wherein the data abstraction hides the implementation data structure from the text editor.

2. The system of claim 1 wherein splitting the flowing text content into different text elements comprises splitting the flowing text content into two different text elements, wherein a third location identifies a split location of the flow text content and the split is performed by inserting a symbol immediately before or after the split location.

3. The system of claim 1 wherein the flow editing operations also include merging two text elements, the two text elements being identified by a text range and having a third location located between the first and second location that identifies a merge point, into one text element, wherein the text elements are joined by inserting symbols at the first location and the second location and removing symbols at the third location.

4. The system of claim 1 wherein the editing operations also include copying a text range of the data abstraction.

5. The system of claim 1, wherein the implementation data structure comprises a text tree of pointers and nodes.

6. The computer system as recited in claim 1, wherein non-text elements are images.

7. At a computer system including a processor and system memory, the computer system, a method for editing flowing text content within a layout including intermingled text elements and non-text elements, the method comprising:

providing a data abstraction containing a sequence of symbols representing formatted flowing text content, the sequence of symbols divisible into different text elements, each symbol having a location between the symbol and each adjacent symbol, wherein each location is independent from the adjacent symbols, text elements defined by text ranges between locations within the data abstraction such that the formatted flowing text content can be separated into the different text elements to more easily process editing operations to the formatted flowing text content when the formatted flowing text content is to flow around non-text elements in the layout;

providing a formatted text programming interface for interfacing with the data abstraction, the formatted text programming interface configured to interoperate with text editors to receive input from text editors, the input indicating editing operations that are to be performed on text elements within the formatted flowing text content;

providing an implementation data structure operably coupled to the text object model, the implementation data structure for implementing the layout, including implementing the data abstraction representing the formatted flowing text content into output;

utilizing the formatted programming interface to receive input for a flow editing operation that is to be applied to a text element in the data abstraction, the text element identified by a corresponding text range within the data abstraction rather than by symbols, the corresponding flow editing operation for editing the text element to flow around a non-text element within the layout, the corresponding text range identified by a first location and a second location within the data abstraction, wherein each symbol has a location between the symbol and each adjacent symbol, wherein each location is independent of the adjacent symbols, the first location and the second location indicating a sequence of symbols between the first location and the second location;

the processor utilizing the formatted programming interface to perform the flow editing operation directly on the corresponding text range to split the text element into a first text element and a second text element, the first text element to precede the non-text element in the layout, the second text element to succeed the non-text element in the layout, the location of the first and second text elements in the layout making the text element appear to flow around the non-text element within the layout, performing the flow editing operation directly on the corresponding text range ensuring that appropriate context for the first and second text elements is propagated to the first and second text elements without having to add data to the implementation data structure;

utilizing the implementation data structure to output the edited data abstraction as an updated user view of the layout; and visually displaying an updated user view of the layout, the updated user view of the layout including the text element flowing around the non-text element.

8. The method of claim 7 wherein the first location is identified by a first text position object and the second location is identified by a second position object.

9. The method of claim 8 wherein a text position object is defined to be a reference to a location in the data abstraction.

10. The method of claim 8 wherein a text position object comprises an element identification position pointing to a location relative to an element in the data abstraction.

11. The method of claim 9 wherein the text position object comprises a text navigator object that may be a movable reference to any location in the data abstraction.

12. The method of claim 7 wherein the text range comprises a text selection object.

13. The method of claim 12 wherein the text selection object comprises a caret.

14. The method of claim 7 wherein performing an editing operation on the text range comprises undoing an editing operation on the text range.

15. The method of claim 5 wherein splitting the text element into first and second text elements, comprises:
    inserting the first and second text elements within the data abstraction;
    transferring properties of the text element to the first and second text elements; and
    extracting the opening and closing tags of the text element from the data abstraction.

16. The method of claim 15 wherein transferring properties of the text element to the first and second text elements comprises copying associated properties of an opening tag of the text element to an opening tag of each of the first and second text elements.

17. The method of claim 15 wherein transferring properties of the text element to the first and second text elements comprises copying associated properties of a closing tag of the text element to a closing tag of each of the first and second text elements.

18. The method of claim 5 wherein the first location and the second location are normalized inward by skipping formatting symbols from each location at the end of the text range to a location adjacent to the first non-formatting symbol within the text range.

19. A computer program product for use at a computer system, the computer program product for implementing a method for editing text elements, the computer program product comprising a computer-readable storage media storing having stored thereon computer-executable instructions that, when executed at a processor, cause the computer system to performing the method including the following:
    providing a data abstraction containing a sequence of text symbols representing formatted text, the sequence of text symbols arranged into different text elements, each text symbol having a location between the text symbol and each adjacent text symbol, wherein each location is independent from the adjacent text symbols, text elements defined by text ranges between locations within the data abstraction such that the formatted text can be arranged into the different text elements to more easily process editing operations to the formatted text when the formatted text is intermingled with image elements in a layout;
    providing a formatted text programming interface for interfacing with the data abstraction, the formatted text programming interface configured to interoperate with text editors to receive input from text editors, the input indicating editing operations that are to be performed on text elements within the formatted text;
    providing an implementation data structure operably coupled to the text object model, the implementation data structure for implementing the layout, including implementing the data abstraction representing the formatted text into output;
    utilizing the formatted programming interface to receive input for a flow editing operation that is to be applied to a text element in the data abstraction, the text element identified by a corresponding text range within the data abstraction rather than by text symbols, the corresponding flow editing operation for editing the text element to position the text element relative to an image element within the layout, the corresponding text range identified by a first location and a second location within the data abstraction;
    the processor normalizing the first location and the second location to resolve ambiguity between the display view perception of the text element and the text position for implementing an edit operation to the text element, normalization resulting in a normalized text range, normalizing including:
        skipping all formatting symbols from the first location in a forward direction to a location adjacent to the first text symbol in the text element, the location adjacent to the first text symbol being the first normalized location; and
        skipping all formatting symbols from the second location in a backward direction to a location adjacent to the last text symbol in the text element, the location adjacent to the last text symbol being the second normalized location;
    utilizing the formatted programming interface to perform an editing operation directly on the normalized text range of the data abstraction indicated by the normalized first location and the normalized second location, performing the editing operation directly on the normalized text range ensuring that appropriate context for any relevant text elements is propagated to the relevant text elements without having to add data to the implementation data structure;
    utilizing the implementation data structure to output the edited data abstraction as an updated user view of the layout; and
    displaying an updated user view of the layout, the updated user view of the layout reflecting the results of the edit operation, the updated user view of the layout intermingling the relevant text elements with image elements in accordance with the propagated context.

20. The computer program product of claim 19 wherein performing an editing operation directly on the normalized text range comprises merging two original elements of the data abstraction into a new element.

21. The computer program product of claim 20 wherein merging two original elements of the data abstraction into a new element, comprises:
    inserting the new element within the data abstraction;
    transferring properties of the two original elements to the new element; and
    extracting the opening and closing tags of the two original elements from the data abstraction.

22. The computer program product of claim 21 wherein inserting the new element within the data abstraction comprises inserting the opening tag of the new element immediately before the opening tag of the first original element.

23. The computer program product of claim 21 wherein inserting the new element within the data abstraction comprises inserting the closing tag of the new element immediately after the closing tag of the second original element.

24. The computer program product of claim 21 wherein transferring properties of the two original elements to the new element comprises copying associated properties of an opening tag of the first original element to an opening tag of the new element.

25. The computer program product of claim 21 wherein transferring properties of the two original elements to the new element comprises copying associated properties of a closing tag of the first original element to a closing tag of the new element.

26. The computer program product of claim 21 wherein transferring properties of the two original elements to the new element comprises copying associated properties of an opening tag of the second original element to an opening tag of the new element.

27. The computer program product of claim 21 wherein transferring properties of the two original elements to the new element comprises copying associated properties of a closing tag of the second original element to a closing tag of the new element.

28. The computer program product of claim 19 wherein performing an editing operation directly on the normalized text range comprises copying a text range of the data abstraction.

29. The computer program product of claim 28 wherein copying a text range of the data abstraction, comprises:
   copying the opening and closing tags of ancestor elements into a copy of the text range;
   copying the opening and closing tags of elements enclosing a subelement at the beginning of the text range into the copy of the text range;
   copying the opening and closing tags of elements enclosing a subelement at the end of the text range into the copy of the text range;
   inserting range boundary markers into the copy of the text range;
   copying content within the opening and closing tags of the elements enclosing any subelements at the beginning of the text range into the copy of the text range;
   copying content within the opening and closing tags of the elements enclosing any subelements at the end of the text range into the copy of the text range; and
   copying elements within the text range into the copy of the text range.

30. The computer program product of claim 29 wherein copying the opening and closing tags of ancestor elements into a copy of the text range comprises copying the associated properties of the opening and closing tags of ancestor elements into the associated properties of the copied opening and closing tags of ancestor elements within the copy of the text range.

31. The computer program product of 29 wherein copying the opening and closing tags of elements enclosing a subelement at the beginning of the text range and at the end of a text range comprises copying associated properties of the tags.

32. The computer program product of claim 29 wherein inserting range boundary markers into the copy of the text range comprises inserting a range boundary marker into the copy of the text range adjacent to a tag copied from a tag closest to a location referenced by a text position defining the text range being copied.

33. The computer program product of claim 29 wherein copying content within the opening and closing tags of the elements enclosing any subelements at the beginning of the text range into the copy of the text range comprises copying content from the subelement at the beginning of the text range into the copy of the text range between a fragment start range boundary marker and a copy of a closing tag of the elements.

34. The computer program product of claim 29 wherein copying content within the opening and closing tags of the elements enclosing any subelements at the end of the text range into the copy of the text range comprises copying content from the subelement at the end of the text range into the copy of the text range between a copy of an opening tag of the elements and a fragment end range boundary marker.

35. The computer program product of claim 29 wherein copying elements within the text range into the copy of the text range comprises copying content of the elements within the text range into the copy of the text range.

36. The computer program product of claim 19 wherein displaying a user view of the layout comprises normalizing the position of a text position in the data abstraction that corresponds to an insertion point of the user view.

\* \* \* \* \*

UNITED STATES PATENT AND TRADEMARK OFFICE
CERTIFICATE OF CORRECTION

| | | |
|---|---|---|
| PATENT NO. | : 7,613,709 B2 | |
| APPLICATION NO. | : 10/971471 | |
| DATED | : November 3, 2009 | |
| INVENTOR(S) | : Alex Mogilevsky et al. | |

It is certified that error appears in the above-identified patent and that said Letters Patent is hereby corrected as shown below:

In column 5, line 29, delete "124" and insert -- 194 --, therefor.

In column 17, line 11, in Claim 15, delete "5" and insert -- 7 --, therefor.

In column 17, line 29, in Claim 18, delete "5" and insert -- 7 --, therefor.

Signed and Sealed this
Twenty-seventh Day of September, 2011

David J. Kappos
*Director of the United States Patent and Trademark Office*